US011204055B2

(12) United States Patent
Lajewardi et al.

(10) Patent No.: US 11,204,055 B2
(45) Date of Patent: Dec. 21, 2021

(54) SHEET METAL SCREW

(71) Applicant: THE HILLMAN GROUP, INC., Cincinnati, OH (US)

(72) Inventors: Farhad Lajewardi, Toronto (CA); Michael K. Falkenstein, Toronto (CA); Shreenivas Iyer, Ontario (CA); Hamid Faghidi, Ontario (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 170 days.

(21) Appl. No.: 16/107,247

(22) Filed: Aug. 21, 2018

(65) Prior Publication Data

US 2019/0063480 A1  Feb. 28, 2019

Related U.S. Application Data

(60) Provisional application No. 62/552,553, filed on Aug. 31, 2017.

(51) Int. Cl.
*F16B 25/00* (2006.01)
*F16B 25/10* (2006.01)
*F16B 33/02* (2006.01)

(52) U.S. Cl.
CPC ........ *F16B 25/0073* (2013.01); *F16B 25/103* (2013.01); *F16B 25/0021* (2013.01); *F16B 25/0084* (2013.01); *F16B 33/02* (2013.01)

(58) Field of Classification Search
CPC ...... F16B 25/10; F16B 25/103; F16B 25/106; F16B 25/0073; F16B 25/0021; F16B 33/02
See application file for complete search history.

(56) References Cited

U.S. PATENT DOCUMENTS

| 3,093,028 | A | * | 6/1963 | Mathie | F16B 25/0031 411/387.4 |
| 3,125,923 | A | | 3/1964 | Hanneman | |
| 3,207,023 | A | * | 9/1965 | Knohl | F16B 25/0031 411/387.3 |
| 3,238,836 | A | * | 3/1966 | Johnson | F16B 25/0078 411/387.4 |
| 3,710,676 | A | * | 1/1973 | Ringland | F16B 25/103 411/387.7 |
| 3,933,075 | A | * | 1/1976 | Peterson | F16B 25/0084 411/387.7 |

(Continued)

FOREIGN PATENT DOCUMENTS

| EP | 1207312 | 5/2002 |
| EP | 2811182 | 12/2014 |

(Continued)

OTHER PUBLICATIONS

NPL#1: Sheet Metal Screws, Mutual Screw & Supply, Apr. 21, 2016, <https://web.archive.org/web/20160421190408/http://blog.mutualscrew.com/2015/07/07/types-and-uses-of-sheet-metal-screws/> (Year: 2016).*

(Continued)

*Primary Examiner* — Victor D Batson
*Assistant Examiner* — Amit Singh Dhillon
(74) *Attorney, Agent, or Firm* — Thompson Hine LLP

(57) ABSTRACT

A sheet metal screw includes one or more of a tapered self-drilling tip, an asymmetric thread angle and/or a tri-lobular thread edge profile.

3 Claims, 6 Drawing Sheets

(56) References Cited

U.S. PATENT DOCUMENTS

| | | | |
|---|---|---|---|
| 3,965,793 A * | 6/1976 | Roser | F16B 25/0015 411/386 |
| 4,060,020 A | 11/1977 | Poliak | |
| 4,125,050 A * | 11/1978 | Schwartzman | F16B 25/0084 408/228 |
| 4,222,689 A * | 9/1980 | Fujiwara | F16B 25/0031 408/227 |
| 4,241,639 A | 12/1980 | Baer | |
| 4,323,326 A * | 4/1982 | Okada | F16B 25/0021 411/311 |
| 4,407,620 A * | 10/1983 | Shinjo | F16B 25/103 411/387.7 |
| 4,516,893 A | 5/1985 | Barth | |
| 4,568,229 A * | 2/1986 | Hulsey | F16B 25/0021 408/227 |
| 4,586,862 A * | 5/1986 | Yamasaki | F16B 25/0021 411/387.8 |
| 4,705,441 A | 11/1987 | Arnold | |
| 4,749,319 A | 6/1988 | Sygnator | |
| 4,764,066 A | 8/1988 | Terrell | |
| 4,781,506 A | 11/1988 | Roberts | |
| 4,787,792 A * | 11/1988 | Jesson | F16B 25/0084 408/229 |
| 4,797,045 A | 1/1989 | Lautenschlager, Jr. | |
| 5,304,023 A * | 4/1994 | Toback | F16B 33/004 411/387.3 |
| 5,356,253 A | 10/1994 | Whitesell | |
| 5,490,700 A | 2/1996 | Zuckerman | |
| 5,540,531 A * | 7/1996 | Choiniere | F16B 25/0031 411/387.1 |
| 5,739,983 A | 4/1998 | Shigemoto | |
| 5,882,161 A * | 3/1999 | Birkelbach | F16B 25/0021 411/387.7 |
| D418,048 S | 12/1999 | Chan | |
| 6,254,327 B1 * | 7/2001 | Chen | F16B 25/0015 411/310 |
| 6,294,751 B1 | 9/2001 | Gall | |
| D552,977 S | 10/2007 | He | |
| D643,279 S | 8/2011 | Crane | |
| 8,408,856 B2 * | 4/2013 | Ernst | F16B 25/0031 411/387.1 |
| 8,419,332 B2 | 4/2013 | Kochheiser | |
| 9,115,746 B2 | 8/2015 | Mair | |
| 9,518,599 B2 | 12/2016 | Tapata | |
| 10,197,087 B2 * | 2/2019 | Hargis | F16B 25/0057 |
| 2001/0005474 A1 * | 6/2001 | Chen | F16B 25/0015 411/416 |
| 2002/0127085 A1 * | 9/2002 | Field | F16B 25/0021 411/387.6 |
| 2004/0018069 A1 * | 1/2004 | Lai | F16B 25/103 411/387.1 |
| 2004/0096293 A1 * | 5/2004 | Tadich | F16B 25/0031 411/387.8 |
| 2007/0065252 A1 | 3/2007 | Su | |
| 2008/0014047 A1 * | 1/2008 | Dohi | F16B 35/041 411/387.4 |
| 2009/0028665 A1 * | 1/2009 | Chang | F16B 25/0078 411/387.3 |
| 2009/0047096 A1 * | 2/2009 | Lin | F16B 25/0015 411/411 |
| 2009/0269163 A1 | 10/2009 | Huang | |
| 2010/0119327 A1 * | 5/2010 | Lin | F16B 25/103 411/387.8 |
| 2010/0129175 A1 * | 5/2010 | Wunderlich | F16B 25/0068 411/387.2 |
| 2011/0217145 A1 * | 9/2011 | Kochheiser | F16B 25/106 411/412 |
| 2012/0251268 A1 * | 10/2012 | Yu | F16B 25/0015 411/393 |
| 2013/0039720 A1 * | 2/2013 | Shih | F16B 25/0015 411/387.4 |
| 2013/0047414 A1 * | 2/2013 | Werthwein | F16B 25/106 29/525.12 |
| 2013/0089389 A1 | 4/2013 | Gong | |
| 2014/0112734 A1 * | 4/2014 | Ambros | F16B 25/0021 411/387.1 |
| 2014/0314522 A1 * | 10/2014 | Lin | F16B 25/0057 411/387.1 |
| 2015/0052735 A1 * | 2/2015 | Kochheiser | F16B 25/0084 29/525.11 |
| 2015/0176623 A1 * | 6/2015 | Vogel | F16B 25/0063 411/387.4 |
| 2016/0146241 A1 * | 5/2016 | Eckert | F16B 25/0078 411/387.3 |
| 2017/0152881 A1 * | 6/2017 | Yang | F16B 25/0084 |

FOREIGN PATENT DOCUMENTS

| | | | |
|---|---|---|---|
| EP | 2811182 A1 * | 12/2014 | F16B 25/103 |
| JP | 2010116949 A * | 5/2010 | F16B 35/065 |

OTHER PUBLICATIONS

NPL#2: Tanner Sheet Metal Screws, Mar. 24, 2017, p. 3 <https://web.archive.org/web/20170324001133/https://resources.tannerbolt.com/articles/3-common-screw-types-at-a-glance-machine-sheet-metal-and-cap-screws/> (Year: 2017).*

PCT, International Search Report and Written Opinion, International Application No. PCT/US2018/047190; dated Oct. 10, 2018, 11 pages.

* cited by examiner

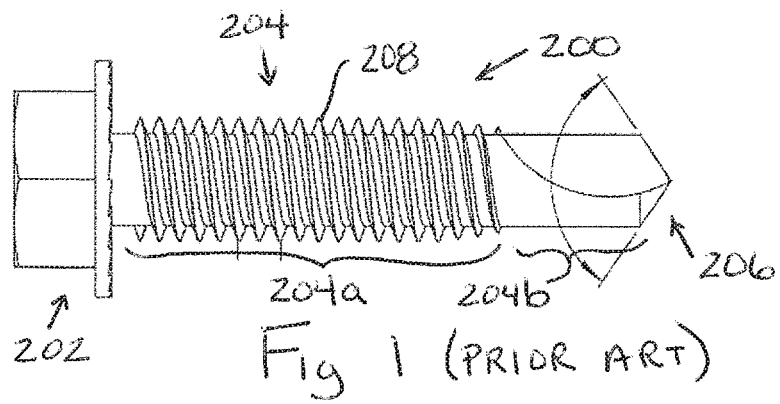
Fig 1 (PRIOR ART)
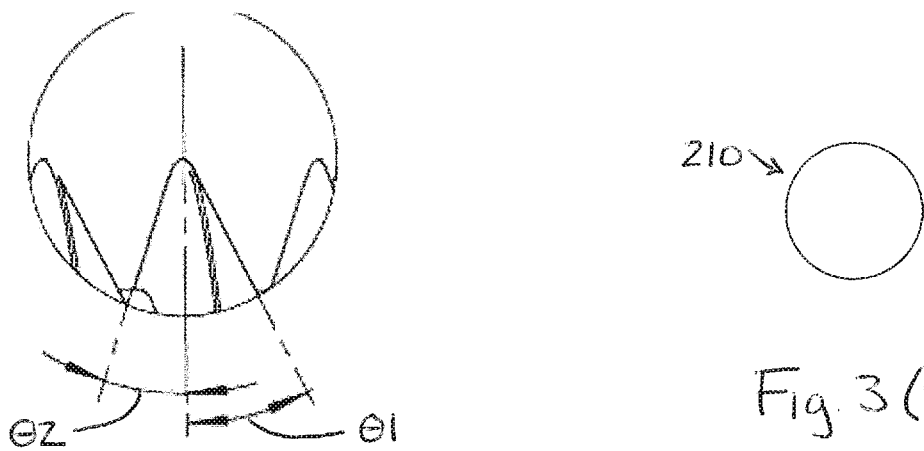
Fig 2 (PRIOR ART)
Fig 3 (PRIOR ART)
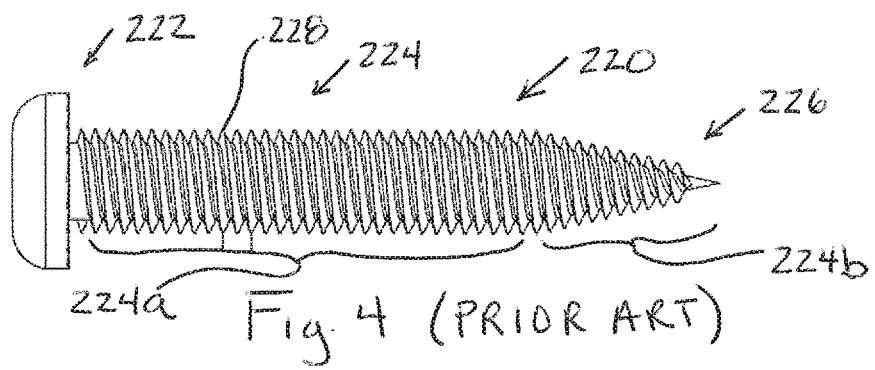
Fig 4 (PRIOR ART)

SHEET METAL SCREW

TECHNICAL FIELD

This application relates generally to sheet metal screws, and more particularly, to a self-drilling sheet metal screw or a self-piercing sheet metal screw.

BACKGROUND

A typical self-drilling sheet metal screw 200 (FIG. 1) for thicker sheet metals (e.g., 0.0598 inch or greater) includes a head end 202, shank 204 extending from the head and an entry tip end 206 at the opposite end of the shank. The shank includes a primary portion 204*a* running from proximate to the head and having a self-tapping thread 208, while the remainder 204*b* of the shank forms a self-drilling tip. The self-tapping thread has a symmetric thread angle (FIG. 2, leading flank angle θ1=trailing flank angle θ2) and circular thread edge profile 210 in end view (FIG. 3). The self-drilling tip lacks any threads, but includes flutes in the shank that help penetrate sheet metal. The diameter of the shank is continuous along both the primary portion and the self-drilling tip up to the entry tip end.

A typical self-piercing sheet metal screw 220 (FIG. 4) for thinner sheet metals (e.g., 0.0359 inch or less) includes a head end 222, shank 224 extending from the head and a pointed tip 226 at the opposite end of the shank. The shank includes a primary portion 224*a* running from proximate the head toward the pointed tip and a tapered portion 224*b* running from the primary portion toward the pointed tip, with a self-tapping thread 228 running from proximate to the head and along both the primary portion and the tapered portion all the way to the pointed tip. The self-tapping thread has a symmetric thread angle (FIG. 2, leading flank angle θ1=trailing flank angle θ2) and circular thread edge profile 210 in end view (FIG. 3).

It would be desirable to provide sheet metal screw configuration that facilitates quick and effective installation.

SUMMARY

In one aspect, a sheet metal screw includes a head end, an entry tip end and shank running between the head end and the entry tip end. The shank includes a first portion that runs from proximate the head end and toward the entry tip end and includes a self-tapping thread, and a second portion that runs from the first portion to the entry tip end and forms a self-drilling tip that is unthreaded. The shank includes at least one flute on the self-drilling tip that runs from the entry tip end toward the first portion of the shank. A base diameter of the shank along the first portion is substantially uniform. A base diameter of the shank along the secondary portion reduces in size when moving from the first portion toward the entry tip end to define a tapered self-drilling tip.

In another aspect, a sheet metal screw includes a head end, an entry tip end and shank running between the head end and the entry tip end. The shank includes a first portion that runs from proximate the head end and toward the entry tip end and includes a self-tapping thread, and a second portion that runs from the first portion toward the entry tip end and forms a self-drilling tip that is unthreaded. The shank includes at least one flute on the self-drilling tip that runs from the entry tip end toward the first portion of the shank. A base diameter of the shank along both the first portion and the second portion is substantially uniform. The self-tapping thread includes a trilobular thread edge profile in end view.

In a further aspect, a sheet metal screw includes a head end, a pointed tip end and shank running between the head end and the pointed tip end. The shank includes a primary portion running from proximate the head end toward the pointed tip end and a tapered portion running from the primary portion toward the pointed tip end, with a self-tapping thread running from proximate to the head and along both the primary portion and the tapered portion toward the pointed tip end. The self-tapping thread has an asymmetric thread angle and a trilobular thread edge profile in end view. The pointed tip may be configured as a self-piecing tip.

In another aspect, a sheet metal screw includes a head end, an entry tip end and shank running between the head end and the entry tip end. The shank includes a first portion that runs from proximate the head end and toward the entry tip end and includes a self-tapping thread, and a second portion that runs from the first portion toward the entry tip end and forms a self-drilling tip that is unthreaded. The shank includes at least one flute on the self-drilling tip that runs from the entry tip end toward the first portion of the shank. A base diameter of the shank along the first portion is substantially uniform and a base diameter of the shank along the second portion is substantially uniform, and the base diameter along the second portion is smaller than the base diameter along the first portion. The self-tapping thread includes a trilobular thread edge profile in end view.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1-4 show prior art screws.

DETAILED DESCRIPTION

Figure 5:
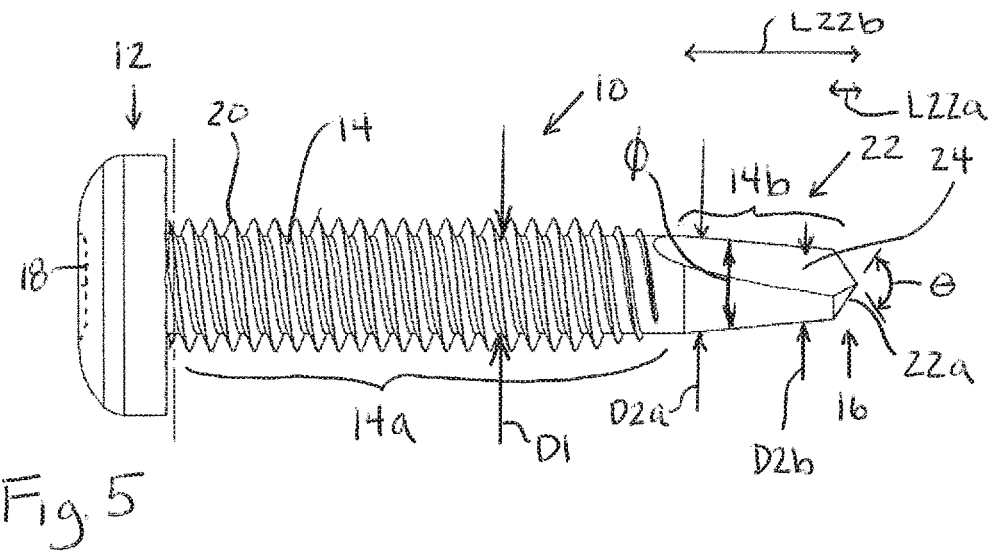
FIG. 5 shows a side elevation of one embodiment of a sheet metal screw.

Referring to FIG. 5, one embodiment of a sheet metal screw 10 is shown. The screw includes a head end 12, a shank 14 (also commonly referred to as the elongated body or elongated core of the screw) and an entry tip end 16. The head end 12 includes a tool engaging part 18 (e.g., in the form of a drive receiving recess) and is located at one end of the shank 14, and the entry tip end 16 is located at an opposite end of the shank 14. The shank 14 includes a first portion 14a that runs from proximate the head toward end 16 and includes a helically extending self-tapping thread 20, and a second portion 14b that runs from the first portion to the entry tip end and forms a self-drilling tip 22 that is unthreaded. The shank includes at least one flute 24 (typically two diametrically opposed flutes) on the self-drilling tip (e.g., as may be created by cutting or forming), where the flute runs from the entry tip end 16 toward the first portion 14a of the shank. The flute(s) are recessed portions of the shank that form cutting edges on the self-drilling tip. A base diameter D1 of the shank along the first portion 14a is substantially uniform. However, a base diameter (D2a, D2b) of the shank along the secondary portion 14b reduces in size, as shown, when moving from the first portion toward the entry tip (e.g., D2a is greater than D2b) to define a tapered self-drilling tip, which also results in a taper in the cutting edge(s) formed by the flute(s). The term base diameter as used herein refers to the projected shank in end view (not taking into account any flutes that may be included in the shank).

A taper angle φ of the tapered self-drilling tip may be between about five degrees and about twenty-seven degrees (e.g., such as between 10 and 15 degrees). As shown, an entry tip segment 22a of the self-drilling tip 22 is defined by an entry taper, and an angle θ of the entry taper is larger (e.g., three or more times larger than the taper angle φ), such as between about one-hundred five and about one-hundred fifteen degrees. An axial length L22a of the entry tip segment may be no more than twenty percent (e.g., no more than about fifteen percent) of an overall axial length L22b of the self-drilling tip. An advantage of a tapered self-drilling tip as described is that it facilitates quicker sheet metal penetration with a smaller hole to provide tighter joint assembly and increased resistance against loosening as a result of vibration.

Figure 6:
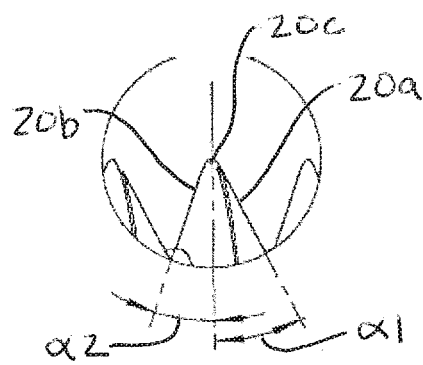
FIG. 6 shows one embodiment of a thread angle for the screw of FIG. 5.

In one implementation, the self-tapping thread 20 includes a symmetric thread angle per FIG. 6 (with the leading flank 20a forming angle α1 and trailing flank 20b forming α2, with α1=α2) and a thread edge 20c that defines a trilobular thread edge profile in end view (FIG. 7—showing lobes 30a, 30b and 30c) that is out of round (with round represented by line 31). In another implementation, the self-tapping thread includes a symmetric thread angle (FIG. 6) and a circular thread edge profile in end view. In either case, by way of example, the symmetric thread angle may be between about thirty and about forty-eight degrees (such as between about thirty-five and forty-five degrees). The smaller symmetric thread angle (as compared to sixty degrees of FIG. 1) results in increased pull-out force and also better joint assembly.

Figure 7:
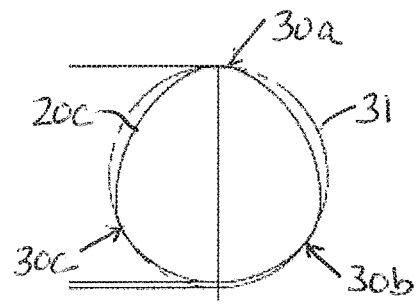
FIG. 7 shows one embodiment of a thread edge profile end view for the screw of FIG. 5.
Figure 8:
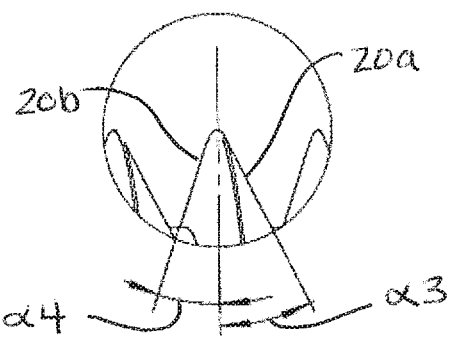
FIG. 8 shows another embodiment of a thread angle for the screw of FIG. 5.

In another implementation, the self-tapping thread includes an asymmetric thread angle (FIG. 8, where leading flank angle α3>trailing flank angle α4). By way of example, the self-tapping thread may include a leading flank 20a defining a leading flank angle α3 of between about twenty and about twenty-five degrees, and a trailing flank 20b defining a trailing flank angle α4 of between about ten and about fifteen degrees. In one variation of this implementation the self-tapping thread includes a trilobular thread edge profile in end view (FIG. 7). The combination of the tapered self-drilling tip, asymmetric thread angle and trilobular thread edge profile in end view provides a unique configuration with fast penetration into thicker sheet metals with reduced torque, which reduces battery consumption for powered install tools, and the combination also provides better joint assembly. In another variation of this implementation, the self-tapping thread includes a circular thread edge profile in end view.

Figure 16:
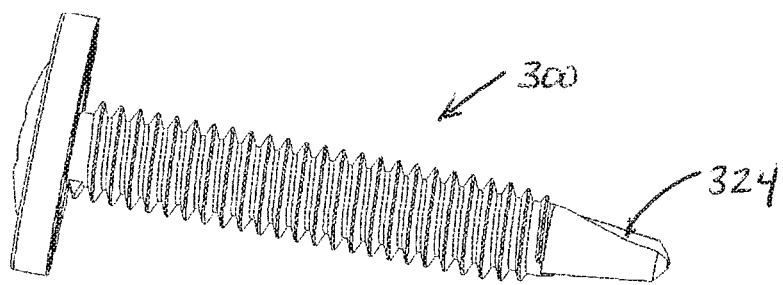
FIGS. 16 and 17 show another embodiment of a sheet metal screw.
Figure 17:
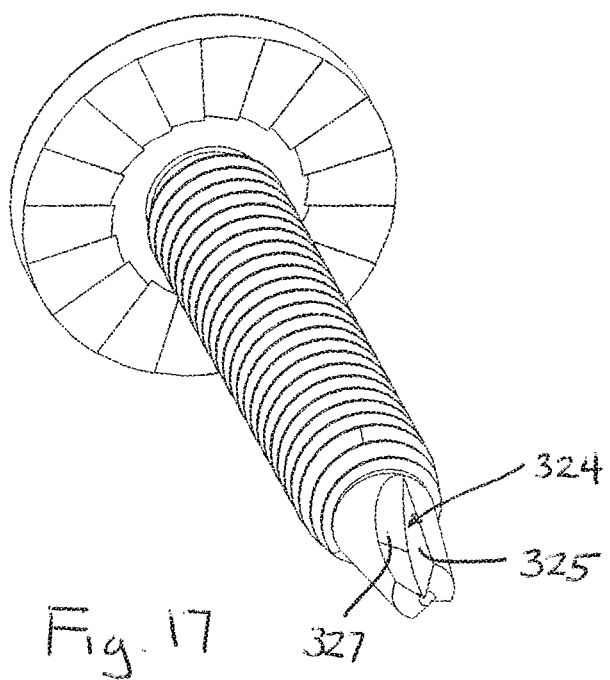

FIGS. 16 and 17 show another embodiment of a sheet metal screw 300, which is similar to screw 10, but with a different head configuration. The diametrically opposed flutes 324 are define by one planar surface 325 and one curved surface 327, where the radially outer edge of the planar surface 325 defines the primary cutting edge of each flute. The flutes 24 of sheet metal screw 10 may be of a similar form.

Figure 9:
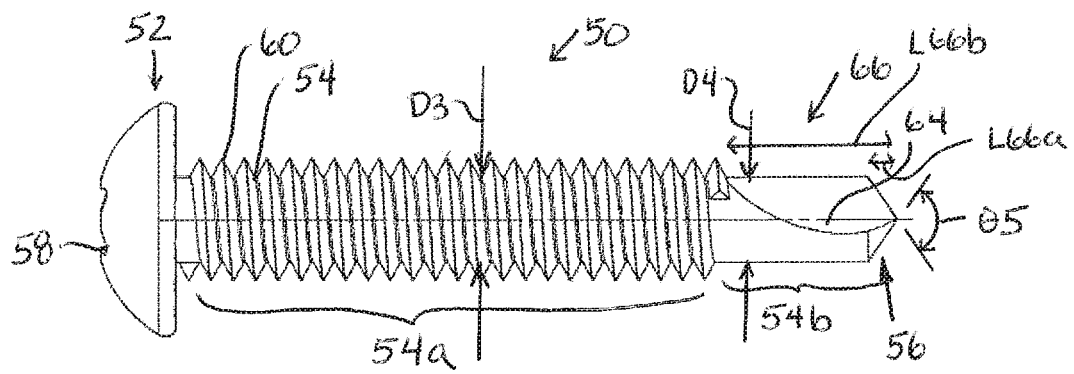
FIG. 9 shows a side elevation of one embodiment of a sheet metal screw.

Referring to FIG. 9, another embodiment of a sheet metal screw 50 is shown. The screw includes a head end 52, a shank 54 and an entry tip end 56. The head end 52 includes a tool engaging part 58 (e.g., in the form of a drive receiving recess) and is located at one end of the shank 54, and the entry tip end 56 is located at an opposite end of the shank 54. The shank 54 includes a first portion 54a that runs from proximate to the head and includes a helically extending self-tapping thread 60, and a second portion 54b that runs from the first portion to the entry tip end and forms a self-drilling tip 66 that is unthreaded. The shank includes at least one flute 64 (typically two diametrically opposed flutes) on the self-drilling tip, where the flute runs from the entry tip end 56 toward the first portion 54a of the shank. In one embodiment, a base diameter D3 of the shank along the first portion 54a is substantially uniform and the shank includes the same substantially uniform base diameter D4 along the major portion of the self-drilling tip 66 (i.e., the self-drilling tip 66 does not include a taper). However, an entry tip segment 66a of the self-drilling tip 66 may be defined by an entry taper with angle θ5 of between about one-hundred five and about one-hundred fifteen degrees, where the axial length L66a of the entry tip segment may be no more than twenty percent of an axial length L66b of the self-drilling tip. In an alternative embodiment, base diameter D4 could be substantially uniform, but slightly less the base diameter D3, in which case a slight step down (e.g., radial step or radial and slightly axial step) would be provided between shank portion 54a and shank portion 54b).

Figure 10:
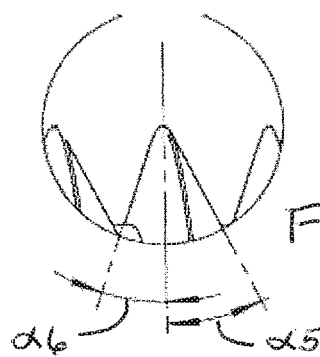
FIG. 10 shows one embodiment of a thread angle for the screw of FIG. 9.
Figure 11:
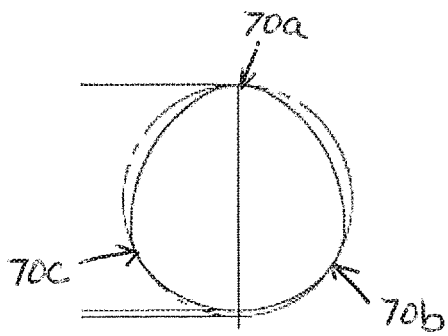
FIG. 11 shows one embodiment of a thread edge profile end view for the screw of FIG. 9.
Figure 12:
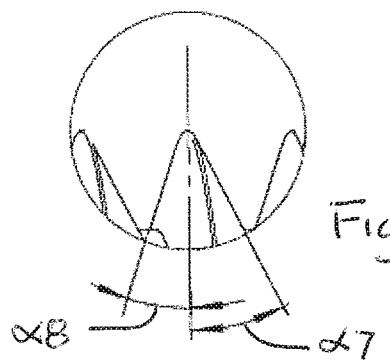
FIG. 12 shows another embodiment of a thread angle for the screw of FIG. 9.

The self-tapping thread 60 includes a trilobular thread edge profile in end view FIG. 11, showing lobes 70a, 70b and 70c). In one implementation, the self-tapping thread includes a symmetric thread, with total thread angle of between about thirty and about forty-eight degrees, such as between about thirty-five and forty-five degrees, (FIG. 10, leading flank angle α5=trailing flank angle α6, and α5+α6 defines the total thread angle). In another implementation, the self-tapping thread 60 includes an asymmetric thread angle (FIG. 12, leading flank angle α7>trailing flank angle α8). By way of example, the asymmetric thread may include a leading flank angle α7 of between about twenty and about twenty-five degrees, and a trailing flank angle α8 of between about ten and about fifteen degrees. The asymmetric thread angle provides increased resistance to pull-out and increased resistance to loosening as result of vibration.

Figure 13:
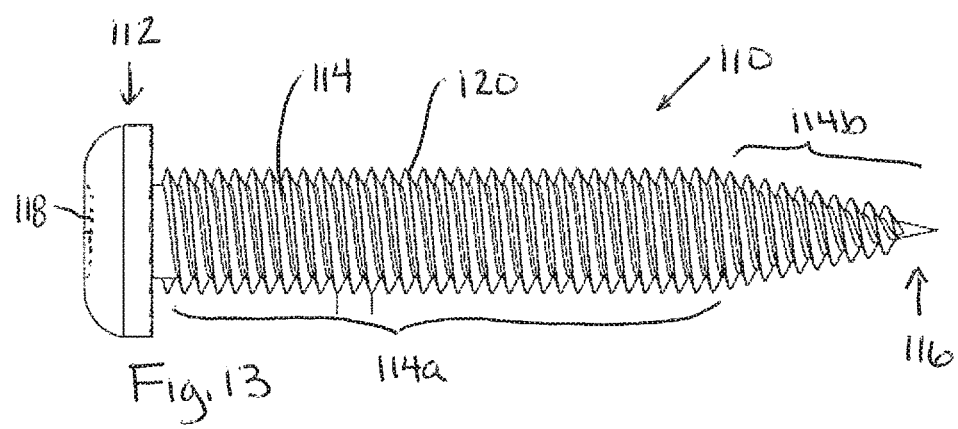
FIG. 13 shows a side elevation of one embodiment of a sheet metal screw.
Figure 14:
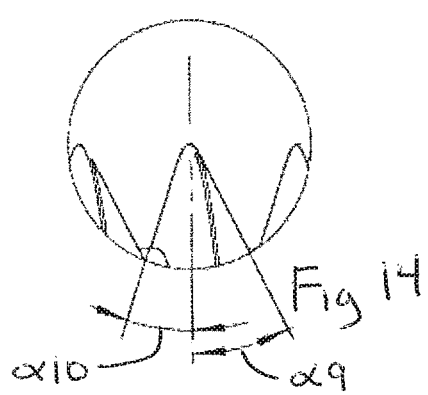
FIG. 14 shows a thread angle for the screw of FIG. 13.
Figure 15:
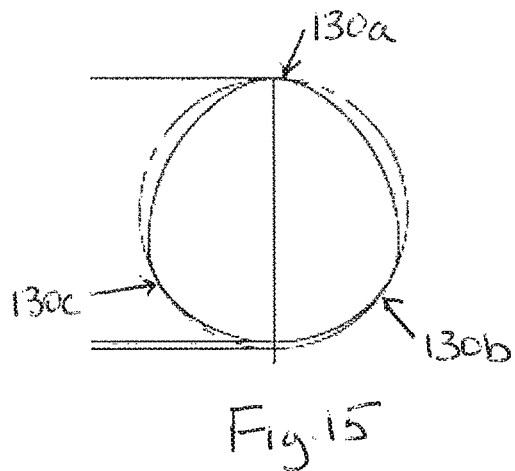
FIG. 15 shows a thread edge profile end view for the screw of FIG. 13.

Referring now to FIG. 13, another embodiment of a sheet metal screw 110 is shown and includes a head end 112, a pointed tip end 116 and shank 114 running between the head end and the pointed tip end. The head end includes a drive recess 118. The shank includes a primary portion 114a running from proximate the head toward end 116 and a tapered portion 114b running from the primary portion to the pointed tip. A self-tapping thread 120 runs helically from proximate to the head and along both the primary portion 114a and the tapered portion 114b to the pointed tip. The self-tapping thread has an asymmetric thread angle (FIG. 14, leading flank angle α9>trailing flank angle α10) and trilobular thread edge profile in end view (FIG. 15, with lobes 130a, 130b and 130c shown). The self-tapping thread 120 may include a leading flank angle of between about twenty and about twenty-five degrees, and a trailing flank angle of between about ten and about fifteen degrees. The combination of the asymmetric thread angle and trilobular thread edge profile in end view is a unique configuration that reduces torque to seat, increases resistance to pull-out, and thus provides a tighter and more robust joint assembly.

It is to be clearly understood that the above description is intended by way of illustration and example only, is not intended to be taken by way of limitation, and that other changes and modifications are possible. For example, while certain relative dimensions have been provided by example above, variations are possible. Moreover, while the screws shown above, such as screws 10 and 300, primarily contemplate a self-tapping thread of the single lead type (i.e., one thread spiral), it is recognized that screw variations with self-tapping threads other than single lead are possible. For example, the sheet metal screws could include threads that are double lead (i.e., two distinct thread spirals that extend along similar portions of the shank such that the thread lead is twice the thread pitch) or triple lead (i.e., three distinct thread spirals that extend along similar portions of the shank such that the thread lead is three times the thread pitch) could be incorporated into any of the above screws.

What is claimed is:

1. A sheet metal screw, comprising:
   a head end, an entry tip end and shank running between the head end and the entry tip end,
   wherein the shank includes a first portion that runs from proximate the head end and toward the entry tip end and includes a self-tapping thread, and a second portion that runs from the first portion to the entry tip end and forms a self-drilling tip that is unthreaded, wherein the shank includes at least one flute on the self-drilling tip,
   wherein a base diameter of the shank along the first portion is a substantially uniform diameter, and
   wherein a base diameter of the shank along the second portion reduces in size when moving from the first portion toward the entry tip end to such that the self-drilling tip is defined as a tapered self-drilling tip;
   wherein a taper angle of a primary portion of the tapered self-drilling tip is between five degrees and twenty-seven degrees;
   wherein the at least one flute runs from the entry tip end, along the primary portion with the taper angle and toward the first portion of the shank;
   wherein the self-tapping thread begins proximate the head end and extends toward the tapered self-drilling tip;
   wherein the self-tapping thread includes a thread edge defined by a symmetric thread angle of between thirty and forty-eight degrees, and the thread edge is continuous and follows a trilobular thread edge profile in end view;
   wherein the self-tapping thread is a double lead thread;
   wherein the head end defines an enlarged head with a lower surface facing the entry tip end,
   wherein the shank has the substantially uniform diameter at a location of joinder of the shank with the lower surface of the enlarged head;
   wherein an entry tip segment of the tapered self-drilling tip is defined by an entry taper, and the entry taper is between one-hundred five and one-hundred fifteen degrees.

2. The sheet metal screw of claim 1 wherein an axial length of the entry tip segment is no more than twenty percent of an axial length of the tapered self-drilling tip.

3. A sheet metal screw, comprising:
   a head end, an entry tip end and shank running between the head end and the entry tip end,
   wherein the shank includes a first portion that runs from proximate the head end and toward the entry tip end and includes a self-tapping thread, and a second portion that runs from the first portion to the entry tip end and forms a self-drilling tip that is unthreaded, wherein the shank includes at least one flute on the self-drilling tip,
   wherein the head end defines an enlarged head with a lower surface facing the entry tip end, wherein the shank has a substantially uniform base diameter along the first portion, including at a location of joinder of the shank to the lower surface, and
   wherein the shank has a reducing base diameter along the second portion when moving from the first portion toward the entry tip end to such that the self-drilling tip is defined as a tapered self-drilling tip;
   wherein a taper angle of a primary portion of the tapered self-drilling tip is between five degrees and twenty-seven degrees;
   wherein the at least one flute runs from the entry tip end, along the primary portion with the taper angle and toward the first portion of the shank;
   wherein the self-tapping thread begins proximate the head end and extends toward the tapered self-drilling tip;
   wherein the self-tapping thread includes an asymmetric thread angle;
   wherein the self-tapping thread includes a thread edge defined by a leading flank angle of between twenty and twenty-five degrees and a trailing flank angle of between ten and fifteen degrees, and the thread edge is continuous and follows a trilobular thread edge profile in end view, facilitating sheet metal penetration, and
   wherein the self-tapping thread is a double lead thread;
   wherein an entry tip segment of the tapered self-drilling tip is defined by an entry taper, and the entry taper is between one-hundred five and one-hundred fifteen degrees.

* * * * *